United States Patent
Soper et al.

(10) Patent No.: US 10,609,304 B2
(45) Date of Patent: Mar. 31, 2020

(54) SYSTEM AND METHOD FOR PROVIDING AND AUTOMOBILE IMAGE AND INFORMATION CAPTURING AND PROCESSING SYSTEM

(71) Applicants: Joshua Soper, Orlando, FL (US); Barry Soper, San Diego, CA (US)

(72) Inventors: Joshua Soper, Orlando, FL (US); Barry Soper, San Diego, CA (US)

(*) Notice: Subject to any disclaimer, the term of this patent is extended or adjusted under 35 U.S.C. 154(b) by 0 days.

(21) Appl. No.: 16/058,162

(22) Filed: Aug. 8, 2018

(65) Prior Publication Data
US 2020/0053294 A1    Feb. 13, 2020

(51) Int. Cl.
| | |
|---|---|
| H04N 7/18 | (2006.01) |
| H04N 5/247 | (2006.01) |
| H04N 5/232 | (2006.01) |
| H04N 5/76 | (2006.01) |
| B60R 16/033 | (2006.01) |

(52) U.S. Cl.
CPC ......... *H04N 5/247* (2013.01); *H04N 5/23245* (2013.01); *H04N 5/76* (2013.01); *H04N 7/181* (2013.01); *B60R 16/033* (2013.01); *B60Y 2400/3015* (2013.01)

(58) Field of Classification Search
CPC ...... H04N 7/18; H04N 5/247; H04N 5/23245; H04N 5/76; H04N 7/181; G60R 16/033; G60Y 2400/3015
USPC ...................................................... 348/148
See application file for complete search history.

(56) References Cited

U.S. PATENT DOCUMENTS

| | | |
|---|---|---|
| 8,379,924 B2 | 2/2013 | Schaufler |
| 8,830,046 B2 | 9/2014 | Yagi |
| 9,325,950 B2 | 4/2016 | Haler |
| 9,718,441 B2 | 8/2017 | Cogill |
| 9,767,675 B2 | 9/2017 | Hutchings |
| 2005/0275510 A1 | 12/2005 | Li |
| 2009/0109008 A1 | 4/2009 | Kuo et al. |
| 2010/0245072 A1* | 9/2010 | Harel ............... G08B 13/19656 340/463 |

(Continued)

FOREIGN PATENT DOCUMENTS

KR   20100004546   1/2010

*Primary Examiner* — Trang U Tran
(74) *Attorney, Agent, or Firm* — Berger Singerman, LLP; Geoffrey Lottenberg

(57) ABSTRACT

An automobile image and information capturing system and method may allow a user to capture and record various vehicle related incidents, including, accidents, thefts, break-ins and other incidents that require reconstruction and visual documentation. Instead of having to rely on external cameras that most likely will not capture usable or complete visual evidence, the present invention provides systems and methods of providing high quality video and still image surveillance from multiple overlapping perspectives. In one preferred embodiment, the present invention consists of (1) a main processor; (2) a plurality of sensor packs; and (3) a Power Over Ethernet battery hub. The sensor packs may employ a plurality of systems and methods for image capture including, but not limited to (1) ultrasonic; (2) LiDAR; (3) visual distance measure devices; and (4) infra-red cameras. Multiple image capturing systems and methods may be used simultaneously, or may be triggered independently via different conditions.

12 Claims, 4 Drawing Sheets

(56) References Cited

U.S. PATENT DOCUMENTS

| | | |
|---|---|---|
| 2010/0271480 A1 | 10/2010 | Bezborodko |
| 2011/0227712 A1 | 9/2011 | Atteck |
| 2014/0285337 A1 | 9/2014 | Gebhardt |
| 2016/0075282 A1* | 3/2016 | Johnson ................. G01S 19/13 701/36 |
| 2016/0148062 A1 | 5/2016 | Fursich |
| 2016/0191861 A1 | 6/2016 | Tinskey et al. |
| 2016/0350601 A1 | 12/2016 | Grauer et al. |
| 2017/0154477 A1 | 6/2017 | Chung |
| 2018/0048801 A1 | 2/2018 | Kiser et al. |
| 2018/0053313 A1 | 2/2018 | Smith |

* cited by examiner

SYSTEM AND METHOD FOR PROVIDING AND AUTOMOBILE IMAGE AND INFORMATION CAPTURING AND PROCESSING SYSTEM

FIELD OF THE INVENTION

The present invention is generally directed toward systems and methods for providing an automobile image and information capturing and processing system.

BACKGROUND

There is an increasing demand in recent years to collect information and images in order to accurately reconstruct incidents related to automobile accidents and break-ins. There is presently no system or method in a public venue that provides a simple, easy to use, system and method for capturing images and information surrounding a vehicle-related incident that can be recorded, stored, processed and transmitted via a communication link to a mobile computing device in real time. In addition to these shortcomings, there is presently no system or method which provides a way to collect low image resolution images and high image resolution images, in sequence, upon the occurrence of a triggering event.

It is with respect to the above issues and other problems presently faced by those of skill in the pertinent art that the embodiments presented herein were contemplated. The present invention solves the problems associated with the prior art and provides an apparatus and method that incorporates a custom automobile monitoring system, that provides high quality redundant imagery that can be used to accurately reconstruct an accident or a break in. Instead of having to rely on external cameras that most likely will not capture usable or complete visual evidence, the present invention provides systems and methods of providing high quality video and still image surveillance from multiple overlapping perspectives. Other advantages and benefits will become apparent after reviewing the Summary and Detailed Description sections below.

SUMMARY OF THE INVENTION

Accordingly, the present disclosure relates to systems and methods that overcome the problems identified above. While several advantages of the system and method of one embodiment are provided in this section, this Summary is neither intended nor should it be construed as being representative of the full extent and scope of the present invention. The present invention is set forth in various levels of detail in the Summary as well as in the attached drawings and in the Detailed Description, and no limitation as to the scope of this disclosure is intended by either the inclusion or non-inclusion of elements, components, etc. in the Summary. Additional aspects of the present disclosure will become more readily apparent from the materials included in the Detailed Description below.

In view of the shortcomings in the prior art, the present invention involves automobile surveillance systems and methods for capturing and recording various vehicle related incidents, including, but not limited to, accidents, thefts, break-ins and other incidents that require reconstruction and visual documentation. The present invention provides systems and methods of providing high quality video and still image surveillance from multiple overlapping perspectives. In one preferred embodiment, the present invention consists of (1) a main processor; (2) a plurality of sensor packs; and (3) a Power Over Ethernet (POE) battery hub. The sensor packs may employ a plurality of systems and methods for image capture including, but not limited to (1) ultrasonic; (2) LiDAR; (3) visual distance measure devices; and (4) infrared cameras. Multiple image capturing systems and methods may be used simultaneously, or may be triggered independently via different conditions. For example, in one preferred embodiment, LiDAR may be used to capture perceived activity at remote distances, fisheye cameras may be used to capture perceived activity at proximate distances and infrared cameras may be used to capture perceived activity at night. In some preferred embodiments, the images are time stamped. The POE battery hub is rechargeable and charges when the vehicle is in operation. In these embodiments, the sensor packs are mounted under the frame on all four sides of the vehicle, thereby allowing complete high resolution quality surveillance coverage of the vehicle. Due to the placement of the sensor packs under the vehicle, the visual and aesthetic appearance of the vehicle is not substantially affected.

The present invention provides continuous 24/7 surveillance and remains active and engaged even when the vehicle is not in use. In one preferred embodiment, a plurality of markers on the sensors are triggered when sufficient activity is perceived, for example, by noise, motion, heat, light, visualization, acceleration, etc. When the markers on the sensors are triggered by sufficient activity, the image detection systems and methods are prompted to convert from low resolution image capture to high resolution image capture. When the activity dissipates, the markers on the sensors deactivate and return to low image resolution capture until sufficient activity is again perceived. The present disclosure maintains high resolution images for roughly two days, and low resolution images for roughly two weeks. The stored images can be wirelessly transferred from the main processor in the vehicle to an external device, such as a smart phone, tablet or computer.

The present invention also discloses a method to use the image detection system where, in one embodiment, highly redundant imagery with full generality of structural shape and height via a plurality of sensor packs located under the frame on all four sides of the automobile is captured, video and still images are recorded simultaneously, low resolution and high resolution videos and images are recorded in sequence, wherein the plurality of sensor packs comprise a plurality of markers that are triggered by sufficient external activity so that the information capturing and processing system is prompted to convert from low resolution capture to high resolution capture until the sufficient external activity dissipates, visual data and information is created, and the visual data and information is transmitted to a mobile computing device via a communication link.

It is to be expressly understood that the ensuing description provides embodiments only, and is not intended to limit the scope, applicability, or configuration of the invention. Rather, this summary will provide those skilled in the art with an enabling description for implementing the embodiments. It should be understood that various changes may be made in the function and arrangement of elements without departing from the spirit and scope of the appended claims.

Furthermore, while embodiments of the present disclosure will be described in connection with various examples, it should be appreciated that embodiments of the present disclosure are not intended to be limited in any way.

While the invention is described in terms of exemplary embodiments, it should be appreciated that individual aspects of the invention may be separately claimed.

BRIEF DESCRIPTION OF THE DRAWINGS

Those of skill in the art will recognize that the following description is merely illustrative of the principles of the disclosure, which may be applied in various ways to provide many different alternative embodiments. This description is made for illustrating the general principles of the teachings of this disclosure invention and is not meant to limit the inventive concepts disclosed herein.

The accompanying drawings, which are incorporated in and constitute a part of the specification, illustrate embodiments of the disclosure and together with the general description of the disclosure given above and the detailed description of the drawings, given below, serve to explain the principles of the disclosure.

In the drawings:

FIG. 1 is a perspective view of the automobile image detection system, according to an embodiment.

FIG. 2 is an exploded view of the plurality of sensors packs, according to an embodiment.

Figure 1:
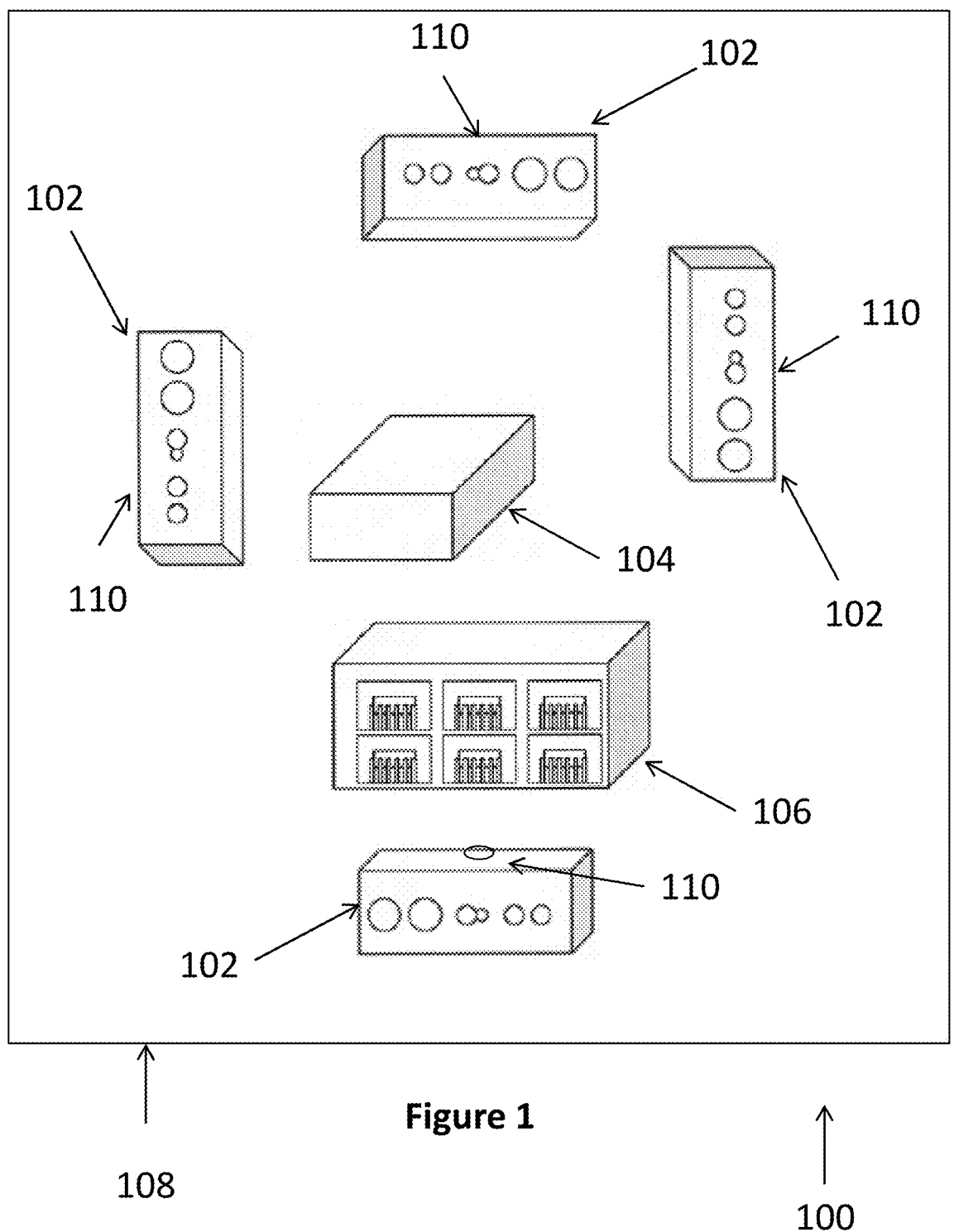
Figure 2:
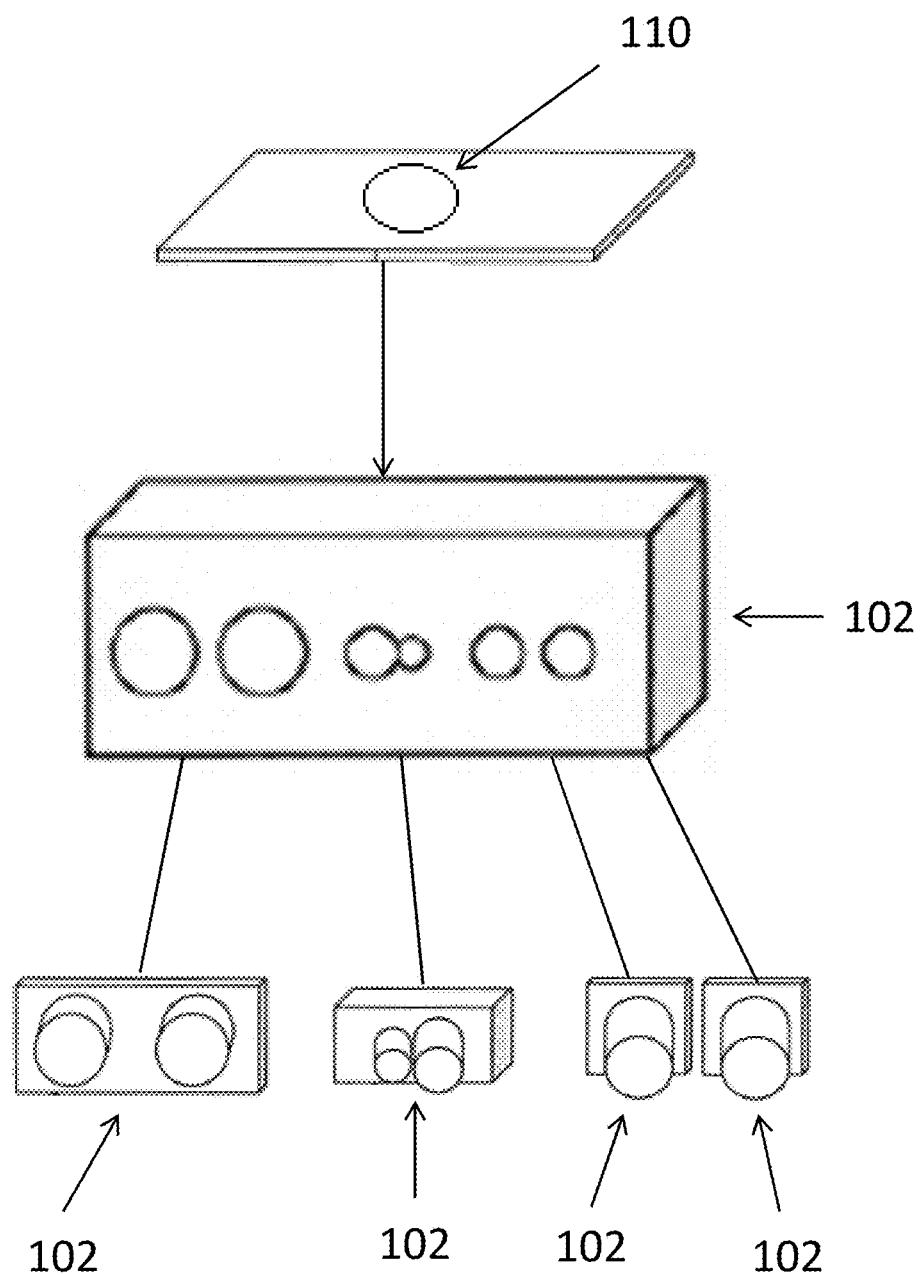
Figure 3:
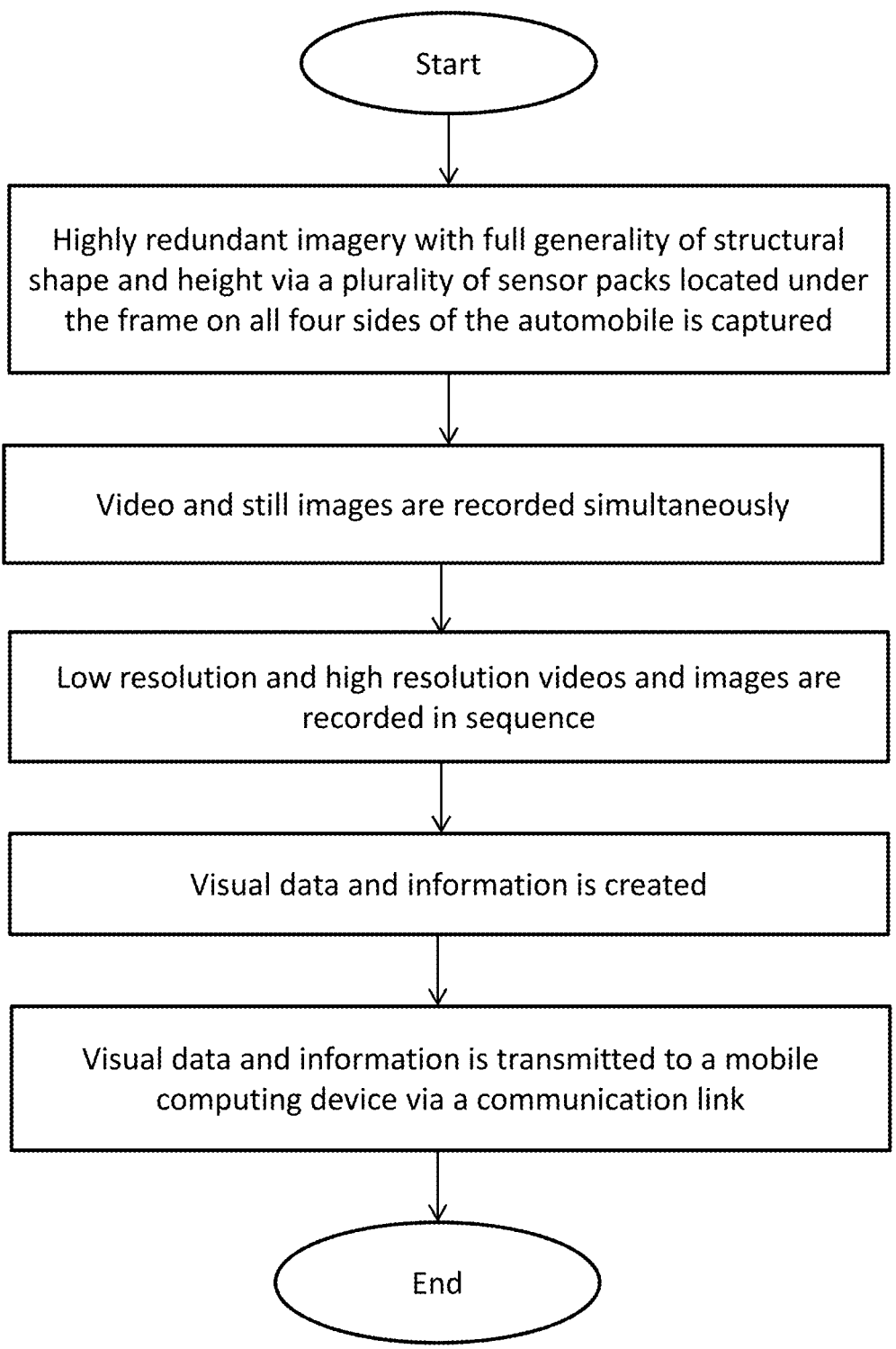

FIG. 3 describes a method for using a system as depicted in FIGS. 1-2.

Figure 4:
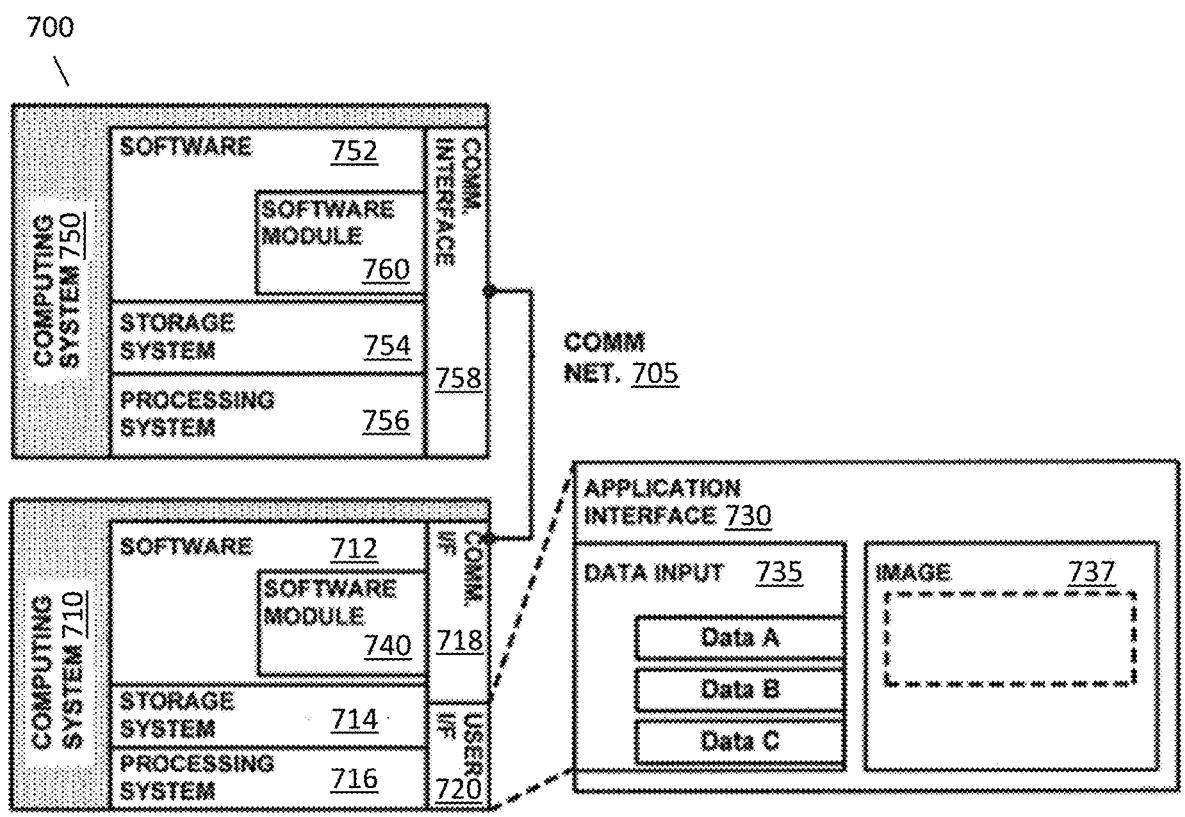

FIG. 4 is a computing environment, according to an embodiment.

It should be understood that the drawings are not necessarily to scale. In certain instances, details that are not necessary for an understanding of the disclosure or that render other details difficult to perceive may have been omitted. It should be understood, of course, that the disclosure is not necessarily limited to the particular embodiments illustrated herein.

DETAILED DESCRIPTION

The present invention provides its benefits across a broad spectrum of endeavors. It is applicant's intent that this specification and the claims appended hereto be accorded a breadth in keeping with the scope and spirit of the invention being disclosed despite what might appear to be limiting language imposed by the requirements of referring to the specific examples disclosed. Thus, to acquaint persons skilled in the pertinent arts most closely related to the present invention, a preferred embodiment of the system is disclosed for the purpose of illustrating the nature of the invention. The exemplary method of installing, assembling and operating the system is described in detail according to the preferred embodiment, without attempting to describe all of the various forms and modifications in which the invention might be embodied. As such, the embodiments described herein are illustrative, and as will become apparent to those skilled in the art, can be modified in numerous ways within the scope and spirit of the invention, the invention being measured by the appended claims and not by the details of the specification.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, subparagraph (f).

Referring now to the drawings, FIGS. 1-2 depict an embodiment of a system 100 according to a preferred embodiment, which comprises a plurality of sensors 102, which are mounted under the frame on all four sides of the vehicle 108, thereby allowing complete high resolution quality surveillance coverage of the vehicle 108. The sensors may operate when the vehicle 108 is at rest or in motion. Due to the placement of the sensor packs under the vehicle 108, the visual and aesthetic appearance of the vehicle 108 is not substantially affected. The sensor 102 may employ a plurality of systems and methods for image capture including, but not limited to, (1) ultrasonic; (2) LiDAR; (3) visual distance measure devices; and (4) infrared cameras. Multiple image capturing systems and methods may be used simultaneously, or may be triggered independently via different conditions. For example, in one preferred embodiment, LiDAR may be used to capture perceived activity at remote distances, fisheye cameras may be used to capture perceived activity at proximate distances and infrared cameras may be used to capture perceived activity at night. In some preferred embodiments, the images are time stamped.

In some preferred embodiments, the plurality of sensors 102 comprise a plurality of markers 110 on the sensors 102 that are triggered when sufficient activity is perceived, for example, by noise, motion, heat, light, visualization, acceleration, etc. When the markers 110 on the sensors 102 are triggered by sufficient activity, the image detection systems 100 are prompted to convert from low resolution image capture to high resolution image capture. When the activity dissipates, the markers 110 on the sensors 102 deactivate and return to low image resolution capture until sufficient activity is again perceived. In some preferred embodiment, the high resolution images are stored for roughly two days, and low resolution images for roughly two weeks. In some preferred embodiments, the stored images can be wirelessly stored on a main processor 104 and transferred from the main processor 104 in the vehicle 108 to an external device, such as a smart phone, tablet or computer, via a communication link.

In both high and low resolution capture, the plurality of sensors 102 provide complete coverage of the vehicle 108 so that redundant imagery with full generality of structural shape and height is obtained and recorded. Moreover, in both high and low resolution capture, video recordings and still images may be obtained and recorded simultaneously.

In some preferred embodiments, the plurality of sensors record in low resolution image capture until a triggering event occurs. For example, when a vehicle approaches the subject vehicle 108, the markers 110 on the sensors 102 switch the system 100 from low image resolution capture to high resolution capture. In these preferred embodiments, if the approaching vehicle does make contact with the subject vehicle 108 with the installed automobile information and process systems, the contact and ensuing accident will be recorded via high resolution capture. Consequently, the circumstances of an accident can be accurately reconstructed, causation can be properly apportioned, and resulting damages can be properly assessed. These considerations are important to not only the parties involved in the accident or incident, but also to related parties and entities such as insurance carriers, technical experts, attorneys and medical professionals.

Once the external activity dissipates, the markers 110 on the sensors 102 deactivate, and high resolution image capture is turned off and low resolution image capture is turned on. As such, high resolution image capture and low resolution image capture operate in sequence, rather than in parallel. In these preferred embodiments, data can be recorded as long as possible in the main processor 104, which has only a limited memory and/or storage capacity.

The automobile information and process systems may also help in the identification of individuals involved in incidents related to vehicle thefts, break-ins, vandalism, etc. During such incidents, the high resolution image capture, which would be triggered by the approaching individual(s), would record and identify the perpetrators involved in the incident.

Referring still to FIGS. 1-2, these preferred embodiments further disclose a main processor 104 configured to receive visual data and information at the main processor 104. The main processor 104 creates modified visual data and information based at least in part on the visual data and information and stores the modified visual data and information at the main processor 104. The modified visual data and information can then be transmitted to a mobile computing device via a communication link. Both high resolution and low resolution videos and images can be stored, processed, and transmitted simultaneously.

These preferred embodiments also disclose a Power Over Ethernet (POE) battery hub 106, which provides power to the systems 100. The POE battery hub 106 is rechargeable and charges when the vehicle 108 is in operation.

The present invention also discloses a method to use the automobile image and information capturing system where, in one embodiment, highly redundant imagery with full generality of structural shape and height via a plurality of sensor packs located under the frame on all four sides of the automobile is captured 202, video and still images are recorded simultaneously 204, low resolution and high resolution videos and images are recorded in sequence, wherein the plurality of sensor packs comprise a plurality of markers that are triggered by sufficient external activity so that the information capturing and processing system is prompted to convert from low resolution capture to high resolution capture until the sufficient external activity dissipates 206, visual data and information is created 208, and the visual data and information is transmitted to a mobile computing device via a communication link 210.

The present invention further discloses a method to use the automobile image and information capturing system where, in one embodiment, the main processor 104 receives visual data and information at the main processor 104, creates modified visual data and information based at least in part on the visual data and information, stores the modified visual data and information, and transmits the modified visual data and information via a communication link.

FIG. 4 illustrates a monitoring computing environment 700 according to one embodiment. Computing environment 700 includes computing system 710 and computing system 750. Computing system 710, in the present example, corresponds to mobile devices that receive the transmitted data and information, and computing system 750 corresponds to main processor 106. Computing system 710 can include any smart phone, tablet computer, laptop computer, or other computing or mobile device capable of reading, and/or recording data about systems, devices, locations, and/or equipment, etc. Computing system 750 can include any server computer, desktop computer, laptop computer, or other device capable of storing and managing the data collected by computing system 710 or other similar computing systems. Either system 710 or 750 can be capable of accomplishing any of the steps of functions described in this description.

In FIG. 4, computing system 710 includes processing system 716, storage system 714, software 712, communication interface 718, and user interface 720. Processing system 716 loads and executes software 712 from storage system 714, including software module 740. When executed by computing system 710, software module 740 directs processing system 716 to receive data, images, devices, locations, and/or equipment, etc. Such data could include any of the information described above, including but not limited to the functionality described in FIGS. 1-3.

Although computing system 710 includes one software module in the present example, it should be understood that one or more modules could provide the same operation. Similarly, the computing systems may be distributed using other computing systems and software.

Additionally, computing system 710 includes communication interface 718 that can be further configured to transmit the collected data to computing system 750 using communication network 705. Communication network 705 could include the Internet, cellular network, satellite network, RF communication, blue-tooth type communication, near field, or any other form of communication network capable of facilitating communication between computing systems 710 and 750. In some examples, communication interface 718 can further include a global positioning system to determine the location of computing system 710.

Referring still to FIG. 4, processing system 716 can comprise a microprocessor and other circuitry that retrieves and executes software 712 from storage system 714. Processing system 716 can be implemented within a single processing device but can also be distributed across multiple processing devices or sub-systems that cooperate in executing program instructions. Examples of processing system 716 include general purpose central processing units, application specific processors, and logic devices, as well as any other type of processing device, combinations of processing devices, or variations thereof. Storage system 714 can comprise any storage media readable by processing system 716, and capable of storing software 712. Storage system 714 can include volatile and nonvolatile, removable and non-removable media implemented in any method or technology for storage of information, such as computer readable instructions, data structures, program modules, or other data. Storage system 714 can be implemented as a single storage device but may also be implemented across multiple storage devices or sub-systems. Storage system 714 can comprise additional elements, such as a controller, capable of communicating with processing system 716.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal. Although one software module is shown, the software may be distributed across many devices, storage media, etc.

User interface 720 can include a mouse, a keyboard, a camera, image capture, a voice input device, a touch input device for receiving a gesture from a user, a motion input device for detecting non-touch gestures and other motions by a user, and other comparable input devices and associated processing elements capable of receiving user input from a user. These input devices can be used for defining and receiving data about the location, maps, systems, devices, locations, and/or equipment, etc. Output devices such as a graphical display, speakers, printer, haptic devices, and other types of output devices may also be included in user interface 720. The aforementioned user input and output devices are well known in the art and need not be discussed at length here.

Application interface 730 can include data input 735 and image display 737. In one example, data input 735 can be used to collect information regarding the location, property boundaries, UAV, maps, etc. It should be understood that although computing system 710 is shown as one system, the system can comprise one or more systems to collect data.

Computing system 750 includes processing system 756, storage system 754, software 752, and communication interface 758. Processing system 756 loads and executes software 752 from storage system 754, including software module 760. When executed by computing system 750, software module 760 directs processing system 710 to store and manage the data from computing system 710 and other similar computing systems. Although computing system 710 includes one software module in the present example, it should be understood that one or more modules could provide the same operation.

Additionally, computing system 750 includes communication interface 758 that can be configured to receive the data from computing system 710 using communication network 705.

Referring still to FIG. 4, processing system 756 can comprise a microprocessor and other circuitry that retrieves and executes software 752 from storage system 754. Processing system 756 can be implemented within a single processing device but can also be distributed across multiple processing devices or sub-systems that cooperate in executing program instructions. Examples of processing system 756 include general purpose central processing units, application specific processors, and logic devices, as well as any other type of processing device, combinations of processing devices, or variations thereof.

Storage system 754 can comprise any storage media readable by processing system 756, and capable of storing software 752 and data from computing system 710. Data from computing system 710 may be stored in a word, excel, or any other form of digital file. Storage system 754 can include volatile and nonvolatile, removable and non-removable media implemented in any method or technology for storage of information, such as computer readable instructions, data structures, program modules, or other data. Storage system 754 can be implemented as a single storage device but may also be implemented across multiple storage devices or sub-systems. Storage system 754 can comprise additional elements, such as a controller, capable of communicating with processing system 756.

Examples of storage media include random access memory, read only memory, magnetic disks, optical disks, flash memory, virtual memory, and non-virtual memory, magnetic cassettes, magnetic tape, magnetic disk storage or other magnetic storage devices, or any other medium which can be used to store the desired information and that may be accessed by an instruction execution system, as well as any combination or variation thereof, or any other type of storage media. In some implementations, the storage media can be a non-transitory storage media. In some implementations, at least a portion of the storage media may be transitory. It should be understood that in no case is the storage media a propagated signal.

In some examples, computing system 750 could include a user interface. The user interface can include a mouse, a keyboard, a voice input device, a touch input device for receiving a gesture from a user, a motion input device for detecting non-touch gestures and other motions by a user, and other comparable input devices and associated processing elements capable of receiving user input from a user. Output devices such as a graphical display, speakers, printer, haptic devices, and other types of output devices may also be included in the user interface. The aforementioned user input and output devices are well known in the art and need not be discussed at length here. It should be understood that although computing system 750 is shown as one system, the system can comprise one or more systems to store and manage received data.

The included descriptions and figures depict specific implementations to teach those skilled in the art how to make and use the best mode. For the purpose of teaching inventive principles, some conventional aspects have been simplified or omitted. Those skilled in the art will appreciate variations from these implementations that fall within the scope of the invention. Those skilled in the art will also appreciate that the features described above can be combined in various ways to form multiple implementations. As a result, the invention is not limited to the specific implementations described above, but only by the claims and their equivalents.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description, with each claim standing on its own as a separate preferred embodiment of the disclosure.

Moreover, though the present disclosure has included description of one or more embodiments and certain variations and modifications, other variations and modifications are within the scope of the disclosure, e.g., the use of a certain component described above alone or in conjunction with other components may comprise a system, while in other aspects the system may be the combination of all of the components described herein, and in different order than that employed for the purpose of communicating the novel aspects of the present disclosure. Other variations and modifications may be within the skill and knowledge of those in the art, after understanding the present disclosure. This method of disclosure is intended to obtain rights which include alternative embodiments to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. An automobile image and information capturing and processing system comprising:
   a plurality of sensor packs located under the frame on all four sides of the automobile and a main processor, the system configured to:
   record, in sequence, low resolution and high resolution images from multiple overlapping perspectives corresponding to the plurality of sensor packs, wherein at least one of the plurality of sensor packs is ultrasonic and is triggered by external activity so that the information capturing and processing system is prompted to convert from low resolution capture to high resolution capture until the external activity dissipates;
   create and store, on the main processor, visual data and information based on the low resolution and high resolution images;
   wherein the low resolution images are stored on the main processor for at a least two weeks and the high resolution images are stored on the main processor for at least two days;
   create and store, on the main processor, modified visual data and information based at least in part on the visual data and information;
   transmit, via a communications link, after the requisite storage periods, the visual data and information and the modified visual data and information.

2. The system of claim 1, further comprising a Power Over Ethernet battery hub.

3. The system of claim 1, wherein the plurality of sensor packs utilize LiDAR technology.

4. The system of claim 1, wherein the plurality of sensor packs utilize infrared technology.

5. The system of claim 2, wherein the Power Over Ethernet battery hub is rechargeable and charges when the automobile is in operation.

6. The system of claim 1, wherein the visual data is time-stamped.

7. A method of capturing and processing automated images comprising:
   providing a plurality of sensor packs located under the frame on all four sides of the automobile;
   recording, in sequence, low resolution and high resolution images from multiple overlapping perspectives corresponding to the plurality of sensor packs, wherein at least one of the plurality of sensor packs is ultrasonic and is triggered by sufficient external activity so that the information capturing and processing system is prompted to convert from low resolution capture to high resolution capture until the sufficient external activity dissipates;
   creating and storing, on a main processing unit, visual data and information based on the low resolution and high resolution images;
   wherein the low resolution images are stored on the main processor for at a least two weeks and the high resolution images are stored on the main processor for at least two days;
   creating and storing, on the main processor, modified visual data and information based at least in part on the visual data and information;
   transmitting transmit, via a communications link, after the requisite storage periods, the visual data and information and the modified visual data and information.

8. The method of claim 7, further comprising a Power Over Ethernet battery hub.

9. The method of claim 7, wherein the plurality of sensor packs utilize LiDAR technology.

10. The method of claim 7, wherein the plurality of sensor packs utilize infrared technology.

11. The method of claim 8, wherein the Power Over Ethernet battery hub is rechargeable and charges when the automobile is in operation.

12. The method of claim 7, wherein the modified visual data is time-stamped.

* * * * *